July 22, 1969
C. W. TUCK
3,456,345
HAIR CUTTING SHEARS
Filed May 8, 1967
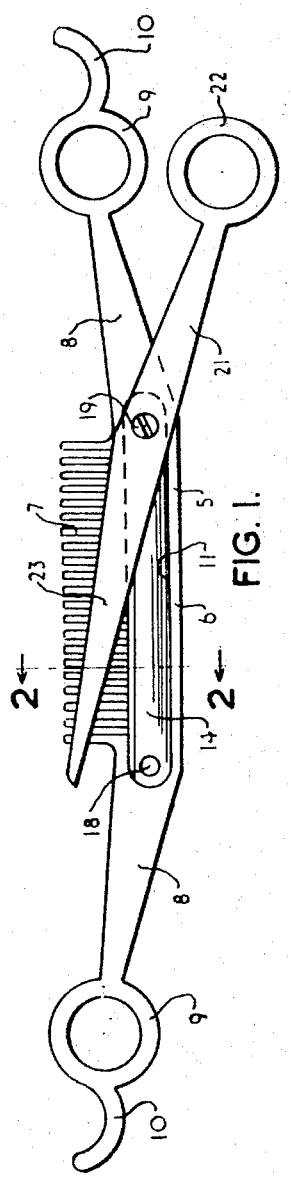
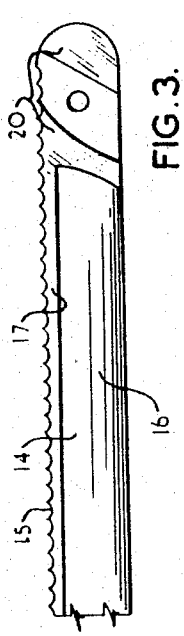
Inventor
CHARLES WORTH TUCK
Attorney

3,456,345
HAIR CUTTING SHEARS
Charles Worth Tuck, 4290 Robina Ave.,
Berkley, Mich. 48072
Filed May 8, 1967, Ser. No. 636,746
Int. Cl. B26b 13/24
U.S. Cl. 30—233.5                          2 Claims

ABSTRACT OF THE DISCLOSURE

Hair cutting shears consisting of a balanced two-handled comb member, with a first blade inserted in a lateral face thereof and a second blade with a handle pivotally attached thereto, the top edge of said first blade rising to a level above the bottom of the teeth of said comb, transversely corrugated along its upper edge and hollow ground on the lower part of its forward face to accentuate a vertical shear strip along the top.

---

This invention relates to improvements in hair cutting shears consisting of an integral two-handled comb member with special balanced wearing shears attached thereto, one of the blades of the shears being firmly imbedded in the comb member.

More than twenty years ago I devised a combined comb and shears for cutting hair that proved to be a useful barbering implement being both simple to make and easy to operate. Because the comb, fixed cutting blade and handle were all individual parts, looseness developed in some cases. This defect was most serious where the blades of the shears were allowed any unwanted separation for then rocking of the fixed blade in the comb element or looseness between the comb and handled frame tended to exaggerate the separation of the shear blades and made it difficult to obtain a good clean cut.

In my present improved shears, the two handled frame and comb are molded as a well balanced integer and the fixed blade that is securely set therein is designed so that it will not rock and also that it will coact with the movable blade in balanced set and wear equalizing relation to assure a clean cut.

In the drawings:

FIGURE 1 is an elevation of my improved shears;

FIGURE 2 is an enlarged vertical transverse section on line 2—2 of FIGURE 1;

FIGURE 3 is a side elevational detail of the fulcrum end of the fixed blade; and FIGURE 4 is a plan of the blade shown in FIGURE 3.

With the introduction of my hair cutting shears embodying a sturdy, easily guided two handled frame member, it became apparent that greater stresses were being applied to the shears as a result of the increased leverage afforded by the two handled frame. Accordingly, I have found it desirable to modify the frame and necessary to improve both the shear blades per se and the manner of mounting the fixed blade relative to the frame.

Referring now particularly to the drawings, 5 indicates an elongated frame with a flat mid-section 6 with an integral centrally positioned, toothed comb 7 rising therefrom. An arm 8 extends outwardly and slightly upwardly from each end of the frame's mid-section 6, having a finger opening 9 on the outer end and terminally provided with a finger rest 10. For the full length of the flat mid-section 6 a shallow pocket 11 extends horizontally from a point near the bottom of the frame to a point above the bottom of the teeth of the comb 7, as will be clearly seen in FIGURE 2. The handle arms 8 are of equal length imparting good balance to the implement and the whole unitary, two handled frame and comb is preferably made of a durable plastic such as "Lexon" (a trademark) or aluminum or suitable light metal alloy.

The shears comprise a pivotally connected pair of blades of novel structural form for this specific purpose. One blade, designated the fixed blade 14 is of a length and depth to nest snugly in the frame pocket 11 with its transversely corrugated horizontal upper edge 15 lying substantially above the bottom of the teeth of the comb 7. This blade is best formed of a casting or forging and in thickness it projects forwardly of the front of the handle frame's mid-section 6. The lower part of the forward face of this fixed blade is hollow ground as at 16 accentuating a substantially vertical shear strip 17 along the top. At one end this fixed blade 14 is firmly secured to the frame 5 as by a chamfer rivet 18 or the like recessed in the blade's hollow ground concavity. At the other end a similar rivet or screw 19 can serve both to secure the blade to the frame and to pivotally attach the second or movable blade of the shears. To assure that the well set blades of the shears wear evenly and work in self-sharpening relation, with no loose or rocking action allowed, the fixed blade 14 on its heel portion and just in advance of the pivot 19 has wear surfaces 20 coplanar with the shear strips 17 and extending for the height of the blade.

The pivotally mounted shear member 21 has the usual handle and finger hole 22 on one end for cooperation with one of the handle ends of the frame 5 and a shearing blade 23 coacting with and complementary to the shear strip 17 of the fixed blade 14. Like the said fixed blade, it too may have a corrugated edge and a marginal shear strip accentuated by a hollow ground portion therebeyond, terminating in advance of the pivot and confronting bearing surfaces, thereby assuring the shearing edges of properly set blades having full self sharpening contact throughout the full length of the cut.

When used, these shears will afford an excellent cutting action when properly set on account of the configuration of the engaging shearing edges and bearing surfaces and the hair being cut on passing through the comb teeth will lie directly on the corrugated edges of the blades which further aid in preventing any creeping thereof.

The balanced, solid feel of the shears in the integral molded two-handled comb frame affords an enhanced control over the movement of the implement and a more effective cutting operation of the shears.

From the foregoing description taken in connection with the accompanying drawings, it will be manifest that hair cutting shears are provided that will fulfil all the necessary requirements of such a device, but as many changes could be made in the above description and many apparently widely different embodiments of the invention may be constructed within the scope of the appended claims, without departing from the spirit or scope thereof, it is intended that all matters contained in the said accompanying specification and drawings shall be interpreted as illustrative and not in a limitative or restrictive sense.

What is claimed as new is:

1. A hair cutting implement comprising in combination a frame member having a mid-section with an integral toothed comb rising therefrom and integral and balanced handle members of equal length extending outwardly and slightly upwardly from opposite ends of said mid-section, said mid-section having a shallow pocket in the face thereof for the full length of said toothed comb and rising to a point above the bottom of the teeth of the comb; and shears consisting of first and second pivotally connected blades with the first blade thereof firmly secured in the pocket in the mid-section of said frame with its upper horizontal edge being transversely corrugated and lying above the bottom of the teeth of said comb and said second blade has a handle for cooperation with one of the handle members of said frame member.

2. A hair cutting implement according to claim 1, wherein said first blade has the lower part of its forward face hollow ground accentuating a vertical shear strip along the top, being secured at one end to said frame by a chamfer rivet recessed in the blade's hollow ground concavity and at the other end by a fastener that pivotally connects the two blades of the shears, said other end of the first blade having wear surfaces on its forward side coplanar with said shear strip disposed on opposite sides of the pivot.

References Cited
UNITED STATES PATENTS

| | | | |
|---|---|---|---|
| 643,539 | 2/1900 | Rowe | 30—256 |
| 2,489,168 | 11/1949 | Tuck | 30—233.5 |

ROBERT C. RIORDON, Primary Examiner

J. C. PETERS, Assistant Examiner